US012659243B2

(12) United States Patent
Báder et al.

(10) Patent No.: US 12,659,243 B2
(45) Date of Patent: Jun. 16, 2026

(54) SERVICE QUALITY ENHANCEMENT FOR UNMANNED AERIAL VEHICLES (UAVS)

(71) Applicant: Telefonaktiebolaget LM Ericsson (publ), Stockholm (SE)

(72) Inventors: Attila Báder, Paty (HU); Gábor Magyar, Dunaharaszti (HU); László Kovács, Martonvásár (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/833,933

(22) PCT Filed: Mar. 4, 2022

(86) PCT No.: PCT/IB2022/051936
§ 371 (c)(1),
(2) Date: Jul. 29, 2024

(87) PCT Pub. No.: WO2023/166334
PCT Pub. Date: Sep. 7, 2023

(65) Prior Publication Data
US 2025/0132988 A1      Apr. 24, 2025

(51) Int. Cl.
H04L 65/80       (2022.01)
G05D 1/644       (2024.01)
(Continued)

(52) U.S. Cl.
CPC ......... H04L 41/5009 (2013.01); G05D 1/644 (2024.01); G05D 1/69 (2024.01);
(Continued)

(58) Field of Classification Search
CPC .. G08G 5/22; G08G 5/26; G08G 5/34; G08G 5/53; G08G 5/55; G08G 5/57;
(Continued)

(56) References Cited

U.S. PATENT DOCUMENTS 9,557,183 B1      1/2017  Ross et al.
11,290,923 B2 *   3/2022  Akdeniz ............... B64C 39/024
(Continued)

FOREIGN PATENT DOCUMENTS

CN          112309175 A      2/2021
EP             3746999 B1 *  3/2025  ............... G08G 5/80
(Continued)

OTHER PUBLICATIONS

International Search Report and Written Opinion issued for PCT/IB2022/051936 mailed on Jan. 4, 2023.
(Continued)

*Primary Examiner* — Calvin Cheung
(74) *Attorney, Agent, or Firm* — Sonoda & Kobayashi Intellectual Property Law; Sarvajit S. Patil

(57)          ABSTRACT

A mobile network analytics system for improving or enhancing the service quality of communications for Unmanned Aerial Vehicles (UAVs) operating in a mobile communications network is provided herein. The system collects service quality information (e.g., service type and related Key Performance indicators (KPIs)) for the different services used by the UAVs. The system also collects the altitudes of the UAVs providing the service quality information. Based on this information, the system estimates the service quality for a given 3-Dimensional (3D) area of space as a function of the 3D location of the UAVs (i.e., latitude, longitude, and altitude of the UAVs). The determined service quality is provided to a UAV flight control system to facilitate the dynamic optimization of a given UAV's flight path, thereby improving the service quality of communications for the given UAV.

17 Claims, 8 Drawing Sheets

(51) Int. Cl.

| | |
|---|---|
| *G05D 1/69* | (2024.01) |
| *H04B 7/185* | (2006.01) |
| *H04L 41/5009* | (2022.01) |
| *H04W 4/02* | (2018.01) |
| *H04W 4/44* | (2018.01) |
| *H04W 24/08* | (2009.01) |

(52) U.S. Cl.
CPC .......... *H04B 7/18506* (2013.01); *H04W 4/02* (2013.01); *H04W 4/44* (2018.02); *H04W 24/08* (2013.01)

(58) Field of Classification Search
CPC ..... G06Q 10/047; H04L 41/12; H04L 41/147; H04L 41/5009; H04L 41/5067; H04L 65/80; H04W 4/02; H04W 4/44; H04W 12/06; H04W 24/08; G05D 1/644; G05D 1/69; H04B 7/18506
See application file for complete search history.

(56) References Cited

U.S. PATENT DOCUMENTS

| | | | | |
|---|---|---|---|---|
| 11,576,008 | B2 * | 2/2023 | Priyanto | ............... H04L 5/0048 |
| 12,302,177 | B2 * | 5/2025 | Liu | ................... H04W 36/0022 |
| 2017/0208560 | A1 | 7/2017 | Papa et al. | |
| 2018/0293897 | A1 | 10/2018 | Murphy et al. | |

FOREIGN PATENT DOCUMENTS

| | | | | | |
|---|---|---|---|---|---|
| WO | WO-2019148188 | A1 * | 8/2019 | ............ | H04W 4/023 |
| WO | WO-2019201435 | A1 * | 10/2019 | .......... | H04M 3/2281 |
| WO | WO-2021215886 | A1 * | 10/2021 | ............ | H04W 24/04 |

OTHER PUBLICATIONS

"3rd Generation Partnership Project; Technical Specification Group Radio Access Network; Study on Enhanced LTE Support for Aerial Vehicles (Release 15)", 3GPP Standard; Technical Report; 3GPP TR 36.777, 3rd Generation Partnership Project (3GPP), Mobile Competence Centre; 650, Route Des Lucioles; F-06921 Sophia-Antipolis Cedex; France, vol. RAN WG2, No. V15.0.0, Jan. 6, 2018, pp. 1-89.

Ericsson: "Remaining aspects for height-based triggering", 3GPP Draft; R2-1807258 Remaining Aspects for Height Based Triggering, 3rd Generation Partnership Project (3GPP), Mobile Compentence Centre; 650m Route Des Lucioles; F-06921 Sophia-Antipolis Cedex; F, vol. RAN WG2, Busan, Korea; May 21, 2018-May 25, 2018, May 20, 2018.

Nokia et al., "Optimized UAS enabled Authentication", 3GPP Draft; S3-203371, 3rd Generation Parnership Project (3GPP), Mobile Competence Centre; 650, Route Des Lucioles; F-06921 sophia-Antipolis Cedex; France, vol. SA WG3, No. e-meeting; Nov. 9, 2020-Nov. 13, 2020, Nov. 13, 2020.

"3rd Generation Partnership Project; Technical Specification Group Services and System Aspects; Study on supporting Unmanned Aerial Systems (UAS) connectivity, Identification and tracking (Release 17)", 3GPP Standard, Technical Report; 3GPP TR 23.754, 3rd Generation Partnership Project (3GPP), obile Competence Centre; 650, Route Des Lucioles; F-06921 Sophia-Antipolis Cedex; France, Dec. 2017, pp. 1-89.

Huawei et al., "TP to 38.890 on open issues of QoE configuration and reporting", 3GPP Draft; R3-211358, 3rd Generation Parnership Project (3GPP), Mobile Competence centRe; 650, Route Des Lucioles; F-06921 Sophia-Antipolis Cedex; France, vol. RAN WG3, No. E-meeting; Jan. 25, 2021-Feb. 5, 2021, Feb. 5, 2021.

3rd Generation Partnership Project; Technical Specification Group Services and System Aspects; Study on application layer support for Unmanned Aerial Systems (UAS); (Release 17), 3GPP TR 23.755 V17.0.0 (Apr. 2021), 66 pages.

3rd Generation Partnership Project; Technical Specification Group Services and System Aspects; Uncrewed Aerial System (UAS) support in 3GPP; Stage 1; Release 17, 3GPP TS 22.125 V17.4.0 (Sep. 2021), 16 pages.

3rd Generation Partnership Project; Technical Specification Group Services and System Aspects; Service requirements for the 5G system; Stage 1 (Release 18), 3GPP TS 22.261 V18.4.0 (Sep. 2021), 107 pages.

* cited by examiner

170

MEMORY
174

176

PROCESSING
CIRCUITRY
172

COMMUNICATIONS
INTERFACE
CIRCUITRY
178

TO/FROM WIRELESS
NETWORK

TO/FROM UAV
MANAGEMENT AND
CONTROL SYSTEM

NETWORK NODE

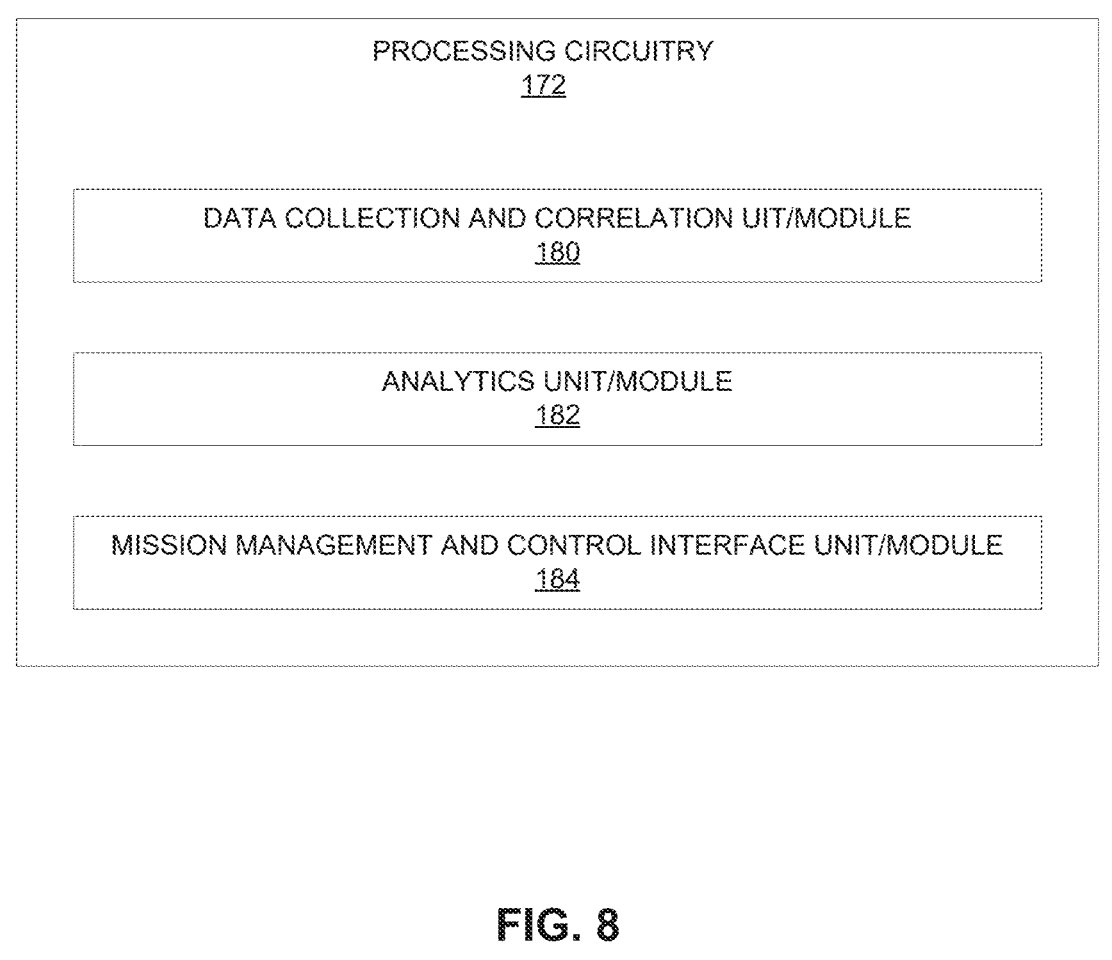

PROCESSING CIRCUITRY
172

DATA COLLECTION AND CORRELATION UIT/MODULE
180

ANALYTICS UNIT/MODULE
182

MISSION MANAGEMENT AND CONTROL INTERFACE UNIT/MODULE
184

FIG. 8

SERVICE QUALITY ENHANCEMENT FOR UNMANNED AERIAL VEHICLES (UAVS)

CROSS-REFERENCE TO RELATED APPLICATIONS

This patent application is a submission under 35 U.S.C. § 371 for U.S. national stage patent application of international application no. PCT/IB2022/051936 filed on Mar. 4, 2022 and entitled "SERVICE QUALITY ENHANCEMENT FOR UNMANNED AERIAL VEHICLES (UAVS)," the entirety of which is incorporated herein by reference.

TECHNICAL FIELD

This application relates generally to managing service quality in a mobile communications network, and more particularly to a system and method for enhancing the service quality of Unmanned Aerial Vehicles (UAVs) operating in a mobile communications network.

BACKGROUND

Network Analytics (NA) systems, which are part of the Network Management (NM) domain, are generally configured to monitor and analyze service and network quality at the session level in mobile communications networks. Additionally, NA systems are increasingly being used for facilitating automatic network operation, improving the network, and reducing or eliminating such service and network issues.

To accomplish these functions, conventional NA systems are configured to continuously monitor basic network Key Performance Indicators (KPIs). The KPIs, which are based on node and network events and counters, may be aggregated for one or more dimensions. Time is one of the most common dimensions, however, KPIs may also be aggregated for node, device type, and/or service provider dimensions. In some cases, KPIs are also aggregated for network dimensions such as for one or more cells, network nodes, and the like. In general, KPIs can indicate node or network failures. However, KPIs typically do not provide enough detail for troubleshooting purposes. Nor are they suitable for identifying end-to-end (E2E), user-perceived service quality issues.

In addressing these issues, some networks utilize more advanced, event-based analytics systems. These more advanced systems generally collect and correlate elementary network events, as well as E2E service quality metrics and computing user level E2E service quality KPIs based on expert or Machine Learning (ML) models. With these conventional systems, per-subscriber and per-session and network KPIs can be collected and aggregated for different network and time dimensions. Further, such systems are suitable for session-based troubleshooting and analyzing network issues and may be used to monitor both radio and core network domains.

SUMMARY

Embodiments of the present disclosure provide a mobile network analytics system and method for improving or enhancing the service quality of communications for Unmanned Aerial Vehicles (UAVs) operating in a mobile communications network. The system and method of the present disclosure operates on a per-flow basis to identify mobile network usage by the UAVs, and collects service quality information (e.g., service type and related KPIs) for different services used by the UAVs as a function of 3-Dimensional (3D) location information of the UAVs (i.e., the latitude, longitude, and altitude of the UAVs).

The present embodiments may collect and aggregate the service quality information for different resolutions. For example, the collected service quality information may be collected and aggregated on a per-service basis, a per-location basis, a time resolution basis (e.g., a sliding window basis), and/or on a time resolution and KPI basis. The service quality information may also be collected and aggregated on other bases. Regardless, the present embodiments are configured to store the aggregated service quality information in persistent storage, such as in a database (DB), for example. So collected and stored, the 3D service quality information can then be exposed to the flight control and management systems associated with the UAVs to facilitate enhancing the service quality of the UAVs.

Accordingly, a first aspect of the present disclosure provides a method, implemented by a network node in a core network (CN), for enhancing a Quality of Experience (QoE) for an Unmanned Aerial Vehicle (UAV). In this aspect, for each of a plurality of UAVs communicating with one or more cells of a wireless communication network, service measurements and location information for the UAV are obtained. The location information comprises altitude information for the UAV. Once obtained, the service measurements and the location information are stored in a database. Thereafter, based on a requested resolution, a 3-Dimensional (3D) region of space is partitioned into a plurality of 3D volumes of space. For each 3D volume of space, a QoE metric is determined based on the service measurements and the altitude information stored in the database and then assigned to the 3D volume of space. A service quality information message comprising a list of one or more QoE metrics assigned to the 3D volume of spaces is then sent to a UAV management and control system. The QoE metrics are then utilized to facilitate optimizing a flight path of a selected UAV relative to the plurality of 3D volumes of space.

In a second aspect, the present disclosure provides a method, implemented by a network node in a core network (CN), for enhancing a Quality of Experience (QoE) for an Unmanned Aerial Vehicle (UAV) communicating with one or more cells of a wireless communication network. In this second aspect, a 3-Dimensional (3D) region of space is partitioned into one or more 3D volumes of space based on a requested resolution. Once partitioned, a service quality information message is generated for the one or more 3D volumes of space. The service quality information message comprises, for each 3D volume of space, a QoE metric determined for the 3D volume of space and coordinates identifying boundaries of the 3D volume of space. The service quality information message is then sent to a UAV management and control system to facilitate optimizing a flight path of a selected UAV relative to the one or more 3D volumes of space.

A third aspect of the present disclosure provides a network node in a core network (CN) for enhancing a Quality of Experience (QoE) for an Unmanned Aerial Vehicle (UAV) communicating with one or more cells of a wireless communication network. In this aspect, for each of a plurality of UAVs communicating with one or more cells of a wireless communication network, the network node is configured to obtain service measurements and location information for the UAV and store the service measurements and the location information in a database. The location information comprises altitude information for the UAV. The network node is further configured to partition a 3-Dimensional (3D) region of space into a plurality of 3D volumes of space based on a requested resolution. Then, for each 3D volume of space, the network node is configured to determine a QoE metric based on the service measurements and the altitude information stored in the database and assign the QoE metric to the 3D volume of space. The network node then sends a service quality information message to a UAV management and control system to facilitate optimizing a flight path of a selected UAV relative to the plurality of 3D volumes of space. In this aspect, the service quality information message comprises a list of one or more QoE metrics assigned to the 3D volume of spaces.

A fourth aspect of the present disclosure provides a network node in a core network (CN) for enhancing a Quality of Experience (QoE) of an Unmanned Aerial Vehicle (UAV) communicating with one or more cells of in a wireless communication network. The network node comprises processing circuitry and memory circuitry. The memory circuitry comprises executable instructions stored thereon that, when executed by the processing circuitry, configures the network node to, for each of a plurality of UAVs communicating with one or more cells of a wireless communication network, obtain service measurements and location information for the UAV and store the service measurements and the location information in a database. The location information comprises altitude information for the UAV. The instructions, when executed by the processing circuitry, also configure the network node to partition a 3-Dimensional (3D) region of space into a plurality of 3D volumes of space based on a requested resolution. Then, for each 3D volume of space, the instructions, when executed by the processing circuitry, configure the network node to determine a QoE metric based on the service measurements and the altitude information stored in the database and assign the QoE metric to the 3D volume of space. The instructions, when executed by the processing circuitry, configure the network node to send a service quality information message to a UAV management and control system to facilitate optimizing a flight path of a selected UAV relative to the plurality of 3D volumes of space. The service quality information message comprises a list of one or more QoE metrics assigned to the 3D volume of spaces.

A fifth aspect of the present disclosure provides a network node in a core network (CN) for enhancing a Quality of Experience (QoE) for an Unmanned Aerial Vehicle (UAV) communicating with one or more cells of a wireless communication network. In this aspect, the network node is configured to partition a 3-Dimensional (3D) region of space into one or more 3D volumes of space based on a requested resolution and generate a service quality information message for the one or more 3D volumes of space. The service quality information message comprises, for each 3D volume of space, a QoE metric determined for the 3D volume of space, and coordinates identifying boundaries of the 3D volume of space. The network node is further configured to send the service quality information message to a UAV management and control system to facilitate optimizing a flight path of a selected UAV relative to the one or more 3D volumes of space.

A sixth aspect of the present disclosure provides a network node in a core network (CN) for enhancing a Quality of Experience (QoE) of an Unmanned Aerial Vehicle (UAV) communicating with one or more cells of in a wireless communication network. In this aspect, the network node comprises processing circuitry and memory circuitry. The memory circuitry comprises executable instructions stored thereon that, when executed by the processing circuitry, configures the network node to partition a 3-Dimensional (3D) region of space into one or more 3D volumes of space based on a requested resolution and generate (140) a service quality information message for the one or more 3D volumes of space. The service quality information message comprises, for each 3D volume of space, a QoE metric determined for the 3D volume of space and coordinates identifying boundaries of the 3D volume of space. Additionally, the executable instructions, when executed by the processing circuitry, further configure the network node to send the service quality information message to a UAV management and control system to facilitate optimizing a flight path of a selected UAV relative to the one or more 3D volumes of space.

BRIEF DESCRIPTION OF THE DRAWINGS

FIG. 8 is a functional block diagram illustrating a computer program product that, when executed by the processing circuitry of a network node, configures the network node to perform embodiments of the present disclosure.

DETAILED DESCRIPTION

Figure 1:
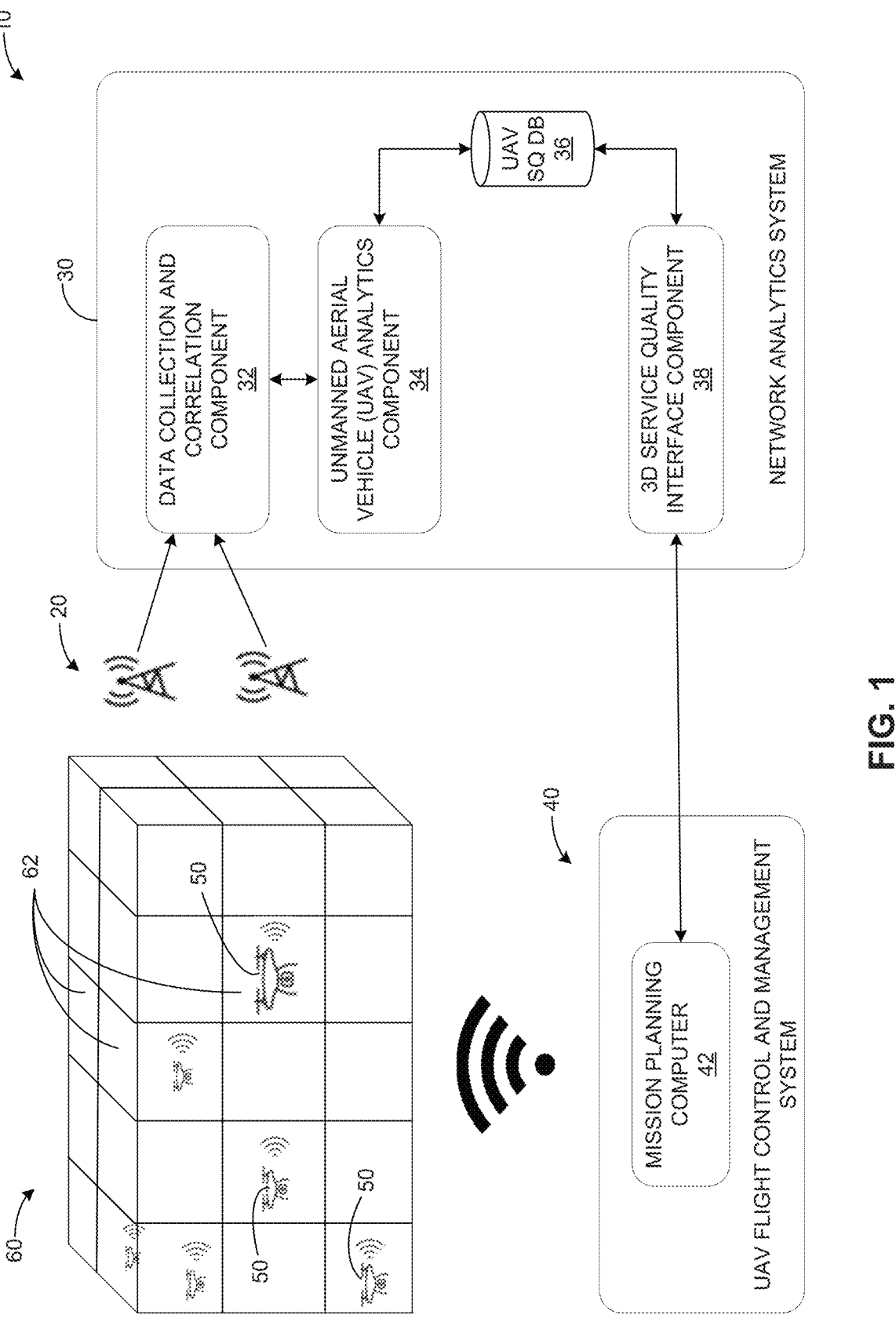
FIG. 1 is a functional block diagram illustrating a system architecture configured to enhance the service quality of Unmanned Aerial Vehicles (UAVs) operating in a mobile communications network according to one embodiment of the present disclosure.

Traditionally, network operators plan and optimize mobile radio networks for operations at the "terrestrial" level (i.e., along the surface of the Earth). This is because most of the mobile devices operating in the mobile network (e.g., User Equipment (UEs)) are at the terrestrial level, and therefore, use the services provided by the network at the terrestrial level. However, not all devices operating in a given mobile radio network utilize the services at a terrestrial level. Some devices, such as UAVs, for example, utilize the services provided by the mobile network above the terrestrial level (i.e., at some altitude above the ground surface).

Nevertheless, the communication and services provided by the mobile radio network for use by the UAVs have recently become very important. One such type of situation is where the UAVs utilize the mobile network for transferring data. Some examples of these types of situations are when UAVs perform camera-based missions and near real-time monitoring missions.

Camera-Based Missions: In many practical applications, such as map related activities or construction monitoring, UAVs are primarily configured to capture a large set of high-resolution images of the underlying terrain. However, the captured images are typically too large for the UAVs to store internally. That is, the UAVs do not have the physical capability to fully accommodate storing the captured images. In these cases, the UAVs periodically transfer the images to a ground control station so that it can begin capturing a new set of images. The duration of this data transfer is largely dependent on the available throughput that the mobile data network provides. Therefore, good service quality is an important consideration for UAVs when executing such a data transfer.

Near-real time monitoring: In another set of practical applications, the data being transferred by the UAVs may not be critical. However, the timeliness of the data is very important. For example, consider a situation where a UAV is configured to use its camera (or other optical sensor) to monitor the amount of traffic on a highway. In these situations, the UAV can easily process the amount of data it collects (e.g., the UAV can easily analyze the images it captures to count the number of vehicles along a specified stretch of the highway); however, it is very important for the UAV to continuously transmit the results of that analysis to a ground control station with very little or no delay. This is because the consumers of the data (e.g., vehicles and/or other devices) connected to the ground control station require a very accurate and up-to-date analysis concerning the amount of traffic to use, for example, in route planning.

A number of 3GPP specifications currently detail the technical aspects for supporting UAV communications in existing 4G and 5G networks. For example:

3GPP TR 36.777 V15.0.0 (2017-12) 3rd Generation Partnership Project; Technical Specification Group Radio Access Network; Study on Enhanced LTE Support for Aerial Vehicles (Release 15), specifies extensions for:

Event reporting indicating that a UAV has crossed a network-configured altitude threshold;

Interference detection based on measurement reporting that is triggered when a configured number of cells fulfils a triggering criteria;

Power control enhancements including UAV specific pathloss compensation factors and extended range of nominal target received power; and Sending flight path information from the UAV to a communications network.

3GPP TR 36.777 V15.0.0 (2017-12) 3rd Generation Partnership Project; Technical Specification Group Radio Access Network; Study on Enhanced LTE Support for Aerial Vehicles (Release 15) introduces two new reporting events for UAVs. These are H1 (i.e., above a predetermined altitude threshold) and H2 (below a predetermined altitude threshold). These reporting events help eNodeBs in the mobile network to identify a given UAV and to handle potential interference. This specification also provided additional measures for signaling and to reduce interference.

3GPP TS 22.125 V17.4.0 (2021-12) 3rd Generation Partnership Project; Technical Specification Group Services and System Aspects; Unmanned Aircraft System (UAS) support in 3GPP; Stage 1; Release 17 includes a study on the potential requirements and use cases for remote UAV identification and on the services to be offered to the UAVs based on the remote identification of the UAVs.

3GPP TR 23.755 V17.0.0 (2021-04) 3rd Generation Partnership Project; Technical Specification Group Services and System Aspects; Study on application layer support for Unmanned Aerial Systems (UAS); (Release 17) includes a study that looks at the potential impact on the application layer, and in particular, the application support/enabler functionalities for UAS Traffic Management (UTM) and the service interactions between the UAS and the UTM (e.g., flight route authorization, location management, group communication support, and the like).

3GPP TS 22.261 V18.5.0 (2021-12) 3rd Generation Partnership Project; Technical Specification Group Services and System Aspects; Service requirements for the 5G system; Stage 1 (Release 18) defines new KPIs for UAVs as well as the communication needs of the UAV with a 3GPP subscription.

3GPP TR 23.754 V17.1.0 (2021-03) 3rd Generation Partnership Project; Technical Specification Group Services and System Aspects; Study on supporting Unmanned Aerial Systems (UAS) connectivity, Identification and tracking (Release 17) addresses system enablers for supporting UAS connectivity, identification, and tracking. Such enablers include, but are not limited to:

a mechanism for UAC controller and UAV identification and tracking in the 3GPP system—this includes how the 3GPP system can provide support for UAV to ground identification (e.g., to authorized third parties such as police devices);

a mechanism to support UAV controller and UAV authorization and authentication by the UTM; and a mechanism to handle unauthorized UAVs and revocation of authorization (e.g., due to a lack of connectivity to carry UAV command and control messages, denied registration, etc.) to enable the system to track of and maintain control of UAV(s).

Thus, providing and maintaining connectivity to UAVs while they move through a 3D region of space is a key feature for future mobile communication systems. However, as stated previously, the cellular networks in which the UAVs operate are primarily optimized for user devices (e.g., UEs) that are ground-based and/or inside buildings. Although conventional optimizations are beneficial to ground-based devices, they necessarily present various challenges to maintaining connectivity and service quality for UAVs.

For example, signal propagation through the atmosphere (i.e., above the ground surface) is line-of-sight propagation that is close to free-space propagation. Due to reduced (or substantially non-existent) path loss, the strength of a transmitted signal through the air is stronger. Although reduced path loss is generally beneficial, there are times when it can be problematic. For example, the same UAV that enjoys a direct line-of-sight path to a serving base station while in-flight will also have line-of-sight paths to multiple non-serving base stations. This can result in high levels of interference and low signal-to-interference-plus-noise ratio (SINR) for the UAVs.

Additionally, base station sidelobes cause another effect that makes the radio environment experienced by UAVs operating above a ground surface different from that experienced by UEs operating on a ground surface. Particularly, UAVs flying above the ground surface may move into an area in which the sidelobes of a given base station are pointed to. In these cases, the sidelobes may end up serving the UAVs flying through the atmosphere most of the time. This will generally result in scattered cell associations for the in-flight UAVs. This is because UE cell association is based on the received signal power, and thus, any in-flight UAVs served by sidelobes might experience very sharp drops in signal strength.

The functionalities introduced by the 3GPP specifications supporting UAVs in 4G and 5G networks help with mobility and connectivity. However, there is still no dedicated solution that ensures or guarantees service quality for UAVs at different locations and altitudes.

Embodiments of the present disclosure, therefore, provide a mobile network analytics system and method for improving or enhancing the service quality of communications for Unmanned Aerial Vehicles (UAVs) operating in a mobile communications network. The system and method of the present disclosure operates on a per-flow basis to identify mobile network usage by the UAVs, and collects service quality information (e.g., service type and related KPIs) for different services used by the UAVs as a function of 3-Dimensional (3D) location information of the UAVs (i.e., the latitude, longitude, and altitude of the UAVs).

In more detail, the present embodiments configure a CN node to collect and aggregate the service quality information for different resolutions. For example, the service quality information may be collected and aggregated on a per-service basis, a per-location basis, a time resolution basis (e.g., a sliding window basis), and/or on a time resolution and KPI basis. The service quality information may also be collected and aggregated on other bases. Regardless, the present embodiments are configured to store the aggregated service quality information in persistent storage, such as in a database (DB), for example. So collected and stored, the 3D service quality information can then be exposed to the flight control and management systems associated with the UAVs to facilitate enhancing the service quality of the UAVs.

For example, in one embodiment, the flight command centers associated with the operators of the UAVs operating in the mobile communications network may request the service quality information for a given 3D region of space from the CN node. Once received from the CN node, the requested service quality information can be used, for example, as input into optimizing the flight path of the UAVs. As described in more detail below, optimizing the flight path of the UAVs according to the present disclosure helps to ensure optimal service quality during UAV missions.

The present embodiments are performed in two independent but related phases or stages. The first phase is a "learning" phase in which a core network (CN) node learns and estimates the service quality of various 3D regions of space with a specific spatial granularity. For example, the CN node may collect information associated with the service quality experienced by one or more UAVs in a given 3D region on a per-service type basis by identifying the UAVs using the service and continuously collecting the service quality information for those services from the identified UAVs. Based on the collected information, the CN node estimates the service quality for the given 3D region of space.

The second phase is an "operation" phase in which the CN node provides the estimated service quality information for a requested 3D region of space to an operator of a UAV (sometimes referred to as, for example, a "drone" operator or a UAV operator). In this stage, the CN node determines estimated service quality information for a requested 3D region of space and provides it to a UAV flight control and management system. Upon receipt, the UAV flight control and management system uses the service quality information in planning and/or modifying the missions of one or more UAVs under its control. For example, the UAV flight control and management system can use the estimated service quality information for to optimize the flight path of a UAV relative to the 3D region of space so as to enhance the service quality of the UAV. Additionally, during the operation phase, the service quality of the UAVs is continuously collected estimated, and used to update the information stored in the DB.

Turning now to the drawings, FIG. 1 illustrates a system 10 for enhancing the service quality of one or more Unmanned Aerial Vehicles (UAVs) 50 operating in a 3-Dimensional (3D) region of space 60 (hereinafter, "3D region 60") according to embodiments of the present disclosure. As seen in FIG. 1, system 10 comprises a Network Analytics System (NAS) 30, a UAV Service Quality Database (UAVSQ DB) 36, and a UAV Flight Control and Management System 40. In operation, each UAV 50 operating in 3D region 60 is communicatively connected to one of a plurality of Radio Access Networks (RANs) 20. Each UAV 50 provides service quality information and its location information, including its altitude, to NAS 30 via RANs 20. NAS 30 collects and aggregates the received information for storage in the UAV SQDB 36, and based on the stored information, provides service quality information to UAV Flight Control and Management System 40. As described in more detail below, a UAV operator controlling a UAV 50 utilizes the information to plan a new flight path for UAV 50, or dynamically adjust an existing flight path of UAV 50, thereby enhancing the service quality experiences by UAV 50 while in flight.

The 3D region 60 may extend from a ground surface to some predetermined altitude above the ground surface and comprises a plurality of 3D volumes of space 62 (hereinafter, "3D volume 62" or "3D volumes 62"). Each UAV 50 occupies at least one 3D volume 62; however, as seen in FIG. 1, more than one UAV 50 may occupy a single 3D volume 62. Regardless, each UAV 50 is controlled by a UAV operator associated with UAV Flight Control and Management System 40 to perform a predetermined mission. In performance of that mission, UAV 50 can be controlled to fly along a flight path in 3D region 60. In this regard, the UAV operator may control UAV 50 to fly vertically, horizontally, and/or diagonally between different 3D volumes 62.

Typically, the UAVs 50 utilize one or more services in the performance of their respective missions. As they fly throughout 3D region 60, however, the service quality they experience will deviate with their location, including their altitude. Therefore, as stated above, each UAV 50 collects, during performance of its mission, service quality measurements and provide those measurements along with its current longitude, latitude, and altitude, to NAS 30.

It should be noted here that reference is made to a UAV operator throughout the disclosure. UAV operators, as is known in the art, are remote pilots that are trained to control the UAV during flight and manage its functions. They are not, however, the same as network operators who control and manage the nodes and functionality of a wireless communications network, such as the one associated with RANs 20.

The NAS 30 may comprise, for example, one or more network nodes and includes a data collection and correlation component 32, an UAV analytics component 34, the UAVSQ DB 36, and a 3D service quality interface component 38. According to the present disclosure, and as described in more detail later, each component 32, 34, 38 may comprise physical circuitry and/or software modules executed by physical circuitry.

The data collection and correlation component 32 is configured to receive service quality measurements and location information from each of the UAVs 50 via RANs 20. In more detail, the data collection and correlation component 32 collects radio event reports received in real-time from different data sources in the mobile network, as well as Core Network (CN) event reports. A real-time correlator function of the data collection and correlation component 32 then correlates the event reports to generate per-session aggregated records and calculates service quality KPIs based on the information contained in the received event reports.

According to the present disclosure, the data collection and correlation component 32 is extended to handle new elements. These are:

Altitude Element: This element indicates the altitude of the UAV 50 and is sent to the data collection and correlation component 32 in the location information of the NodeB event reports (e.g., the radio reports).

UAV Authentication Element: This element indicates that the measurements and other service quality information are being reported by a special type of device (i.e., a UAV). This element differentiates the UAV reporting the information from other more conventional devices (e.g., User Equipment). In at least one embodiment, the UAV Authentication element is received from the RANs 20 as part of signaling procedures (e.g., during a session setup procedure) and may be used to help identify the UAV.

The UAV analytics component 34 is configured to classify the correlated event records and the KPIs received by the data collection and correlation component 32, and further, to analyze that information to identify UAV related service quality information. According to the present disclosure, the UAV analytics component 34 is also configured to aggregate the UAV related service quality information for various time and/or space granularities. This aggregated UAV related service quality information is then sent to UAVSQ DB 36 for storage.

It should be noted here that, although it is possible, the UAV analytics component 34 need not be configured to simply perform these functions only one time. Rather, according to the present embodiments, the UAV analytics component 34 may be configured to continuously "learn" and update the correlated event records and KPIs stored in the UAVSQ DB 36 over time. To accomplish this "learning" aspect, the UAV analytics component 34 may be configured to classify the correlated event records and the KPIs received by the data collection and correlation component 32 substantially continuously, analyze that information to identify UAV related service quality information, aggregate the UAV related service quality information for different 3D volumes 62 for various granularities, and send that information to UAVSQ DB 36 for long-term storage.

The UAVSQ DB 36, as stated above, stores the key information describing the observed service quality for each of the UAVs 50 in service quality records. More specifically, the stored information is for all services and all locations of the UAVs 50 and may have different geographical and temporal granularities. As previously stated, the information in UAVSQ DB 36 may be provided to the UAV Flight Control and Management System 40 responsive to receiving an explicit request for the information from the UAV Flight Control and Management System 40, or as part of an information update service to which the UAV Flight Control and Management System 40 subscribes.

Those of ordinary skill in the art should appreciate that UAVSQ DB 36 may store any information that is needed or desired. However, in one embodiment, UAVSQ DB 36 stores at least the following data:

Location Information: The location information defines the area (e.g., a 3D region 60 or 3D volume 62) for which the given service quality record is valid. The UAVSQ DB 36 contains entries with several different geographical granularities. As described herein, the "geographical granularity" is an adjustable parameter defining a size for the each of the 3D volumes 62. For example, in one embodiment, a 3D volume 62 is a cube and is defined using coordinate pairs in which each coordinate pair defines the latitude, longitude, and altitude of two opposing corners of the cube.

By way of example only, consider a 3D region 60 having an area of 1-km square. The 3D region 60 may be partitioned into the 3D volumes 62 such that each 3D volume 62 is a 100-meter×100-meter cube of space. The coordinate pairs that define any given 3D volume 62, therefore, comprise the latitude, longitude, and altitude of each opposing corner of the given 3D volume 62.

Temporal Information: The temporal information defines a time interval for which a given service quality record is valid. According to the present embodiments, there may be different time intervals for different aggregations in UAVSQ DB 36. Time intervals may be defined for any desired length of time, such as a few hours or a day, for example.

By way of example only, a time window indicating a given time interval may be defined as being weekdays (e.g., Monday-Friday) from 8 am-12 noon. In this case, only those KPI samples measured during that time period would be aggregated and stored.

Additionally, the temporal information may be used in updating the service quality information in UAVSQ DB 36. For example, in one embodiment, the temporal information is used to update the stored information using a "sliding window" technique.

In these aspects, the temporal information would indicate whether the given service quality record is "stale," and if so, allow the service quality record to be updated. In another embodiment, the temporal information is utilized to determine a "weight" for the information in the service quality record. In this aspect, the information stored in the given service quality records would be "weighted" depending on its age. For example, older information may be assigned a lesser weight than newer information. This would help ensure, then, that such older information would not have as great an affect on estimated QoE metrics. The particular weights may be any weights needed or desired.

Service Type: The service type information defines the particular data service that is associated with a given service quality record. Typically, the service type information will indicate that the service is file transfer. However, other services are also possible. In short, the service type information indicates any service that is utilized by a given UAV 50. Thus, this particular information may depend on the particular mission that UAV 50 is to perform (i.e., it depends on the particular UAV 50 application).

KPI Type: The KPI type information are the Quality of Experience (QoE) metrics measured for the given service identified in the Service Type information. According to the present embodiments, there can be a plurality of KPI types available for any given Service Type. Each KPI type will be associated a different service quality record in UAVSQ DB 36.

For example, given a Service Type of "file transfer," the KPI Type could be uplink throughput, round-trip-time (RTT), or packet loss. Each KPI Type would be a different service quality record and be associated with a different set of KPIs.

Average KPI Value: The average KPI value describes the key information in UAVSQ DB 36. More specifically, the average KPI value provides the average value of the KPIs collected with respect to a given UAV 50 location (i.e., longitude, latitude, and altitude of the UAV 50) and time interval, and for a given Service Type and KPI Type.

Number of samples for KPI Type: The present embodiments also store a value indicating the number of samples that used to compute the average KPI value. This enables the continuous update of the information in UAVSQ DB 36 whenever new information arrives.

Deviation of KPI Values: The deviation of KPI values is computed to provide an estimate the reliability of the average KPI value. In one embodiment, the deviation of KPI values is calculated as a standard deviation. However, as those of ordinary skill in the art will appreciate, other techniques may be utilized to compute the deviation of KPI values.

Table 1 illustrates an example structure and example values for a service quality record according to one aspect of the present disclosure.

TABLE 1

| Example Service Quality Record and Values | |
|---|---|
| FIELD | VALUE |
| LOCATION INFORMATION | (lat X, lon X, alt X) –<br>(lat Y, lon Y, alt Y)<br>coordinates defining a<br>3D volume 62 (e.g., a 100 m ×<br>100 m cube) in 3D region 60 |
| TEMPORAL INFORMATION | Weekday 8 AM-12 AM |
| SERVICE TYPE | FILE TRANSFER |
| KPI TYPE | UPLINK THROUGHPUT |
| AVG. KPI VALUE | 4.5 Mbps |
| NO. SAMPLES FOR KPI TYPE | 614 |
| KPI VALUE DEVIATION | 1.8 Mbps |

Additionally, the present embodiments also provide for updating the service quality records in UAVSQ DB 36 when UAVs 50 provide new or updated service quality measurements via the data collection and correlation component 32. Particularly, there are different geographical and temporal granularities predefined by NAS 30. For each new collected data sample, the UAV analytics component 34 scans the UAVSQ DB 36. If the UAV analytics component 34 finds a matching service quality record (e.g., the geographical information, the temporal information, the service type, and the KPI type match) for a given granularity, then the UAV analytics component 34 calculates and updates the average KPI value, the number of samples for KPI type, and the KPI value deviation information of that service quality record.

The 3D Service Quality Interface Component 38 comprises the circuitry and software needed to provide a communication interface with the UAV Flight Control and Management System 40. According to the present embodiments, a mission planning computer 42 associated with the UAV Flight Control and Management System 40 is configured to request service quality information for a given area (e.g., one or more 3D volumes 62) from NAS 30 via the 3D Service Quality Interface Component 38. The request may be for a single UAV 50 or for multiple UAVs 50. In response, NAS 30 determines the requested service quality information and sends that information to the mission planning computer 42 via the 3D Service Quality Interface Component 38. The mission planning computer 42 can then be utilized by a UAV operator to create or adjust the flight path of the UAV 50 based on the service quality information received from the 3D Service Quality Interface Component 38.

According to the present embodiments, the UAV Flight Control and Management System 40 is a ground-based system and comprises one or more mission planning computers 42. The mission planning computers 42, according to the present embodiments, may be co-located or they may be distributed among different physical locations.

The UAV Flight Control and Management System 40 is configured to request and receive the service quality information from NAS 30 in various ways. In one embodiment, for example, the UAV Flight Control and Management System 40 is configured to generate and send an explicit request message to NAS 30 whenever a network operator determines that such information may be needed. In these situations, the UAV Flight Control and Management System 40 generates and sends a service quality information request message for a given area (e.g., a given 3D region 60) and a desired resolution for the given area. The desired resolution, according to the present embodiments, defines the desired size for each 3D volume 62 (e.g., 10 m×10 m, 50 m×50 m, 100 m×100 m, etc.) in the given area. Upon receipt of the service quality information request message, NAS 30 partitions the given area (i.e., the 3D region 60) into the 3D volumes 62 according to the desired resolution and determines the service quality information for each of the 3D volumes 62.

In another embodiment, the UAV Flight Control and Management System 40 subscribes to NAS 30 to receive service quality information updates. The subscription type of request is different from the explicit single request described above in that the UAV Flight Control and Management System 40 indicates the period of the subscription and the frequency of the updates during that subscription in the request message.

Table 2 illustrates an example structure for a service quality information request message according to the present disclosure.

TABLE 2

| Example Structure for a Service Quality Information Request Message | |
|---|---|
| PARAMETER | DESCRIPTION |
| Request ID | This is a unique ID that identifies<br>the request. In one embodiment,<br>the Request ID is arbitrarily generated.<br>In other embodiments, the<br>Request ID is a value that is tracked |

TABLE 2-continued

Example Structure for a Service Quality Information Request Message

| PARAMETER | DESCRIPTION |
| --- | --- |
| | and maintained by one or both of NAS 30 and UAV Flight Control and Management System 40 |
| IP Address | The IP address of the requesting UAV Flight Control and Management System 40 (e.g., the IP address of the mission planning computer 42) |
| Time Stamp | The date/time indicating when the request was sent (e.g., UNIX Epoch) |
| Request Type | Identifies the request as being a single explicit request or a subscription request |
| Requested Time Period | The start and end time for which reports are subscribed in case of subscription (UNIX Epoch) |
| Reporting Frequency | Frequency of the reports in case of subscription (1/hour) |
| Services | List of Service IDs of the services for which service quality is requested |
| Requested Area | List of coordinates determining the boundaries of the area |
| Resolution Requested | Requested resolution of data (Meter) |

When responding to an explicit request from UAV Flight Control and Management System 40, NAS 30 determines the requested service quality information. NAS 30 then generates and sends a service quality information response message including a list of service quality and coordinate pairs for a requested given area. In some embodiments, the service quality information response message is generated and sent on a per-service basis (i.e., for each service listed in the Services field of the request message) according to a supported resolution. The supported resolution (i.e., the size of the 3D volumes 62) is, in some embodiments, the same as the requested resolution. However, the service quality information for the given area may not always be available for the requested resolution. Therefore, in such embodiments, NAS 30 will provide the requested information in a resolution that is closest to the requested resolution. As seen in more detail below, NAS 30 indicates the supported resolution in a separate field of the response message.

For subscriptions, NAS 30 will automatically send service quality information response messages with the requested frequency until the subscription period expires.

Table 3 illustrates an example structure for a service quality information response message according to the present disclosure. The service quality information response message has the same structure regardless of whether it is being sent in response to an explicit, single request or as a subscription update.

TABLE 3

Example Structure for a Service Quality Information Response Message

| PARAMETER | DESCRIPTION |
| --- | --- |
| Response ID | This is a unique ID identifying the response. The unique ID may be arbitrarily generated by NAS 30 or it may be a value that is tracked and maintained by NAS 30 (e.g., a counter value) |

TABLE 3-continued

Example Structure for a Service Quality Information Response Message

| PARAMETER | DESCRIPTION |
| --- | --- |
| Request ID | The Request ID indicated in the Request ID of the Service Quality Information Request Message |
| Time Stamp | The date/time when the response is sent (e.g., UNIX Epoch) |
| Service Quality | A list of Quality of Experience (QoE) metrics and coordinate pairs for the requested area, per-service, with a specified resolution |
| Resolution Supported | This is the supported resolution. The supported resolution may be the same as the requested resolution; however, if that is not possible, the supported resolution is the resolution that is the closest to the requested resolution |

As previously stated, UAVs 50 are configured to perform a variety of practical applications. The present embodiments are beneficial in each of these. For example, consider a use case where a given UAV 50 is configured to perform a mission using a high-resolution camera. In such cases, the UAV 50 may be configured to perform a mapping mission that requires it to capture a large volume of images and/or video during flight. Because of size and weight constraints, for example, UAV 50 generally has a limited internal storage capability. Therefore, the images and/or videos captured by UAV 50 will need to be transferred periodically to the ground-based system. Rather than repeatedly return to the ground to download the images and/or video and restart the mission, UAV 50 can be configured to utilize the mobile data network (e.g., RANs 20) to transfer the image data. In such cases, flying the UAV 50 to a relatively nearby position (i.e., designated by longitude, latitude, and altitude) where the service quality (e.g., the data throughput) is excellent can significantly improve the amount of data that can be transferred in a single mission. Embodiments of the present disclosure can identify the areas where the data throughput is excellent to a network operator, thereby negating the need for UAV 50 to periodically return to the ground to offload the captured images and/or video from its internal memory.

In another practical application, UAV 50 may be configured to monitor an object or set of objects over a period of time. Such applications may be, for example, a monitoring application where UAV 50 is tasked with monitoring the flow of traffic over a given stretch of roadway. In these cases, the amount of data to be transferred may not be very large, and therefore, high data throughput may not be as important a consideration. However, one particularly important concern is the delay experienced by UAV 50 when transferring its data.

For example, UAV 50 may periodically capture images of different stretches of roadway and internally analyze those images to count the number of vehicles. The results of that analysis (e.g., the number of vehicles counted rather than the images) will need to be sent frequently to the ground-based station. The amount of data to be transmitted by UAV 50 is not a factor but the need for a very low latency is a factor. Therefore, the data should be transferred from a location in the sky where delay is tolerable. Embodiments of the present disclosure can identify those particular locations to the UAV Flight Control and Management System 40. The network operator, in turn, can utilize that information to plan and/or dynamically adjust the flight path of UAV 50 so that it can move to those "low latency" positions in the sky when downloading the results of the analysis to the ground-based system.

Figure 2:
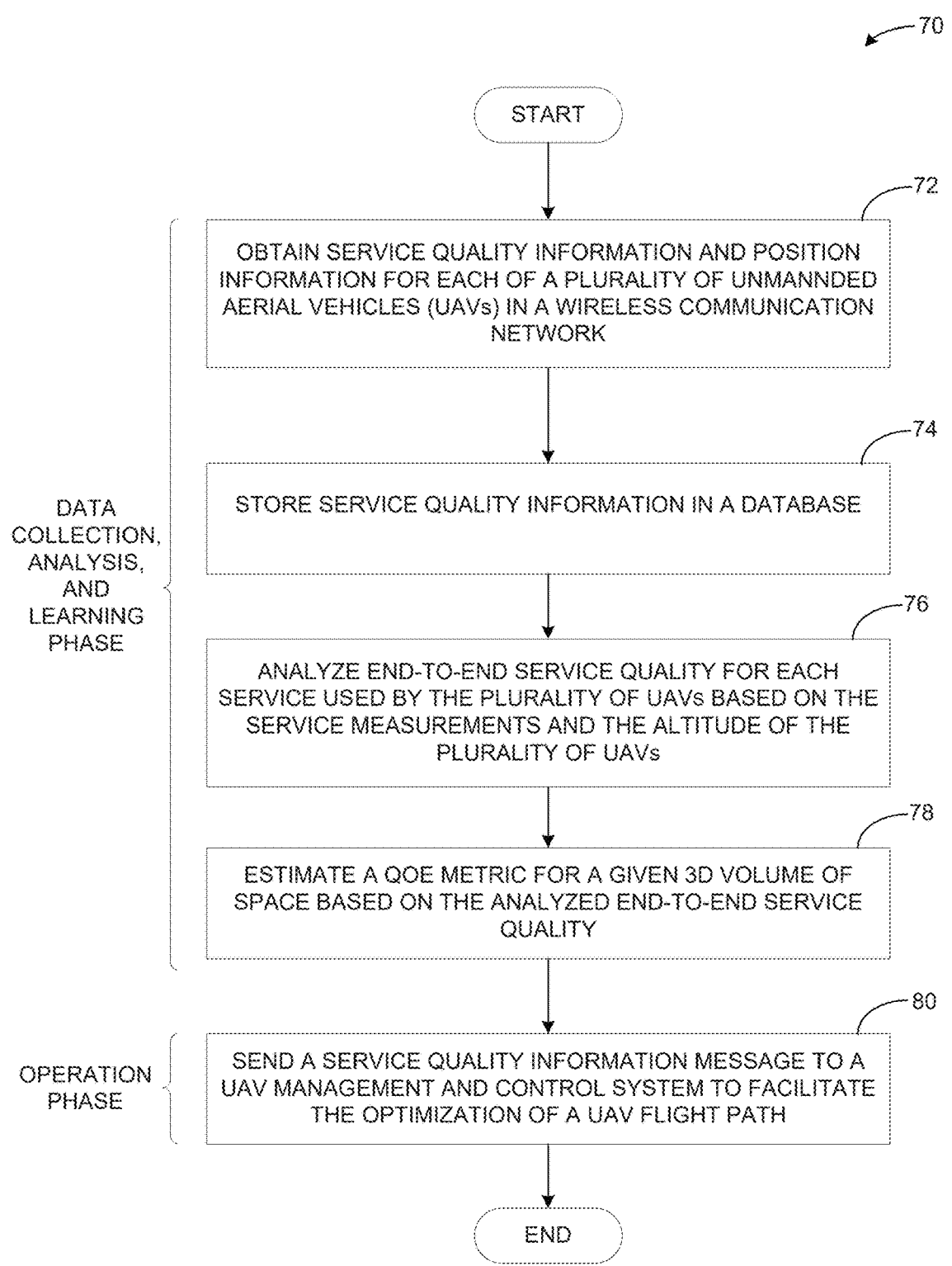
FIG. 2 is a flow diagram illustrating a method of enhancing the service quality of one or more UAVs operating in a mobile communications network according to an embodiment of the present disclosure.

FIG. 2 is a flow diagram illustrating a method 70 of enhancing the service quality of one or more UAVs 50 operating in a mobile communications network according to an embodiment of the present disclosure. As seen in FIG. 2, embodiments of the present disclosure may be performed in two phases-a data collection, analysis, and learning phase and an operation phase. In the data collection, analysis and learning phase, NAS 30 obtains service quality information and location information for each of the plurality of UAVs 50 operating in 3D region 60 (box 72). As stated previously, UAVs 50 are operating in a wireless communication network and provide their service quality and location information to NAS 30 via RANs 20. Upon receipt of the information, NAS 30 stores the received information in UAVSQ DB 36 (box 74). NAS 30 then performs an end-to-end analysis for each of the services used by UAVs 50 based on the reported service measurements and altitude of the UAVs 50 (box 76) and estimates a QoE metric for a given 3D volume 62 based on the end-to-end analysis (box 78). In some embodiments, NAS 30 may store the estimated QoE metric in UAVSQ DB 36.

The processes performed by NAS 30 during the data collection, analysis, and learning phase (i.e., boxes 72, 74, 76, 78) may, as previously described, be repeated over time. Thus, NAS 30 is configured to receive and analyze the data received from UAVs 50 via RANs 20, update the estimate of the QoE metrics based on those analyses, and to update UAVSQ DB 36 with the updated QoE metrics over time.

In the operation phase, NAS 30 sends service quality information messages to the UAV Flight Control and Management system 40 (box 80). The service quality information, which is obtained from the UAVSQ DB 36, facilitates a UAV operator's ability to optimize the flight path of UAVs 50. That is, the UAV operator can determine whether the service quality (e.g., adequate data throughput, low-latency, etc.) is optimal for a UAV 50 performing a mission at its current location and altitude (e.g., a first 3D volume 62), or whether the UAV 50 should be flown to another location and/or altitude (e.g., a second 3D volume 62) where the service quality is indicated by NAS 30 as being better.

Figure 3:
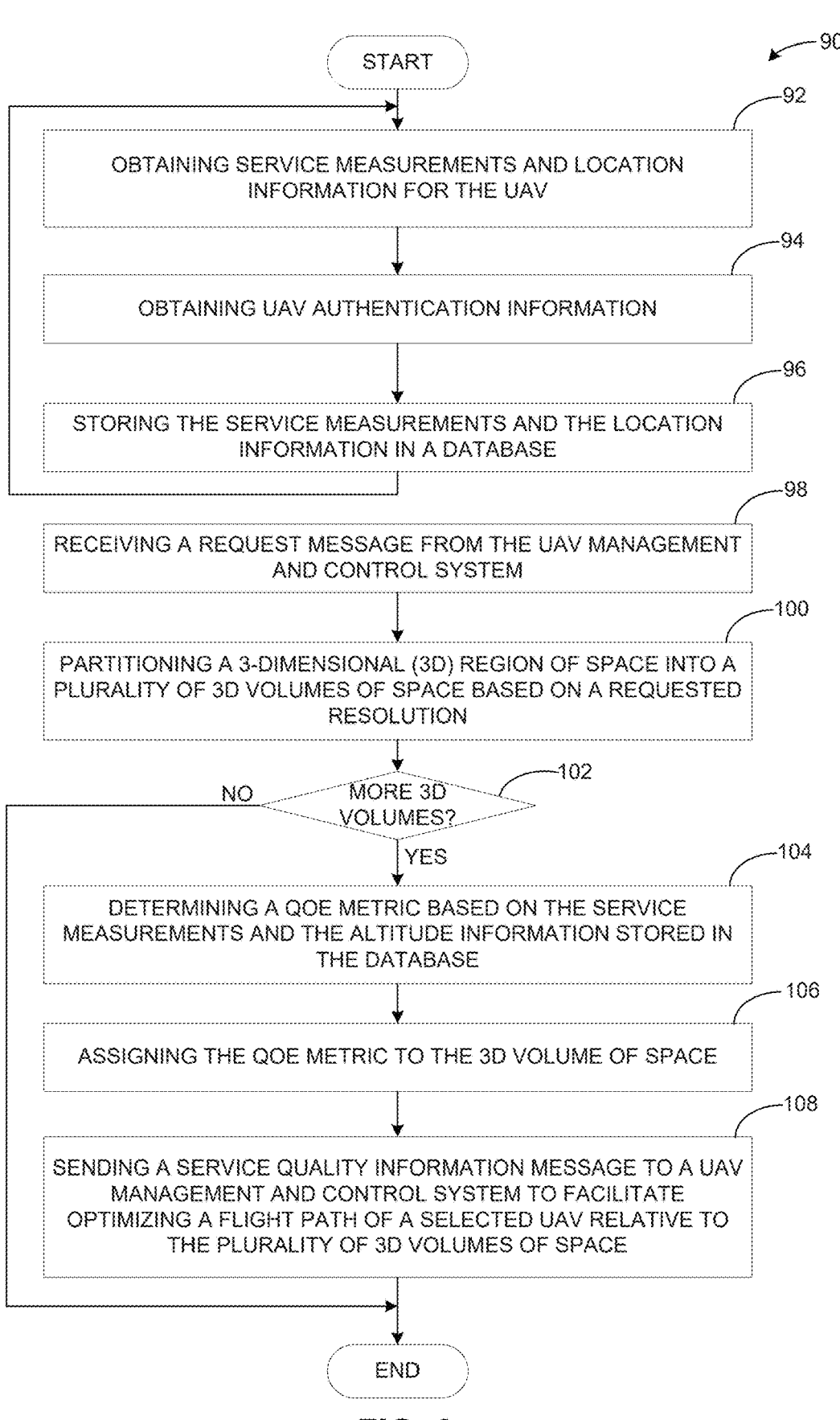
FIG. 3 is a flow diagram illustrating a method of enhancing the service quality of one or more UAVs according to one embodiment of the present disclosure.

FIG. 3 is a flow diagram illustrating a method 90 of enhancing the service quality of one or more UAVs 50 according to one embodiment of the present disclosure. In this embodiment, method 90 is performed by NAS 30 implemented at a network node in the core network.

As seen in FIG. 3, method 90 begins with the data collection and correlation component 32 of NAS 30 obtaining service measurements and location information for a UAV 50 (box 92). As stated previously, the location information received by data collection and correlation component 32 comprises the latitude, longitude, and altitude of the UAV 50 when it collected the service measurements. Additionally, the data collection and correlation component 32 may also obtain authentication information for the UAV 50 (box 94). As previously described, the authentication information may have been provided by UAV 50 via the RAN 20 as part of a signaling in a session setup procedure and indicates that the measurements and the service quality information are being reported by a UAV rather than a terrestrial-based mobile device (e.g., a UE). The UAV analytics component 34 then stores the service measurements and location information in UAVSQ DB 36 (box 96).

At some point, the 3D service quality interface component 38 of NAS 30 receives a request message from the UAV Flight Control and Management system 40 requesting the service quality for a given 3D region (box 98). In response, NAS 30 partitions the identified region 60 into a plurality of 3D volumes 62 based on a resolution that is specified in the request (box 100). Then, for each 3D volume 62 (box 102), NAS 30 determines a QoE metric based on the service measurements and altitudes stored in UAVSQ DB 36 (box 104). In one embodiment, as previously described, the QoE metric is determined based on the results of an end-to-end analysis performed on the service measurements and altitudes stored in UAVSQ DB 36. NAS 30 then assigns the determined QoE metric to a 3D volume 62 (box 106). In some cases, NAS 30 may also store the determined QoE metric in UAVSQ DB 36. Regardless, the 3D service quality interface component 38 sends a service quality information response message to the UAV Flight Control and management system 40 to facilitate optimizing a flight path of UAV 50 relative to the one or more 3D volumes 62 (box 108). As previously stated, the service quality information response message comprises one or more QoE metrics for the one or more 3D volumes 62.

Figure 4:
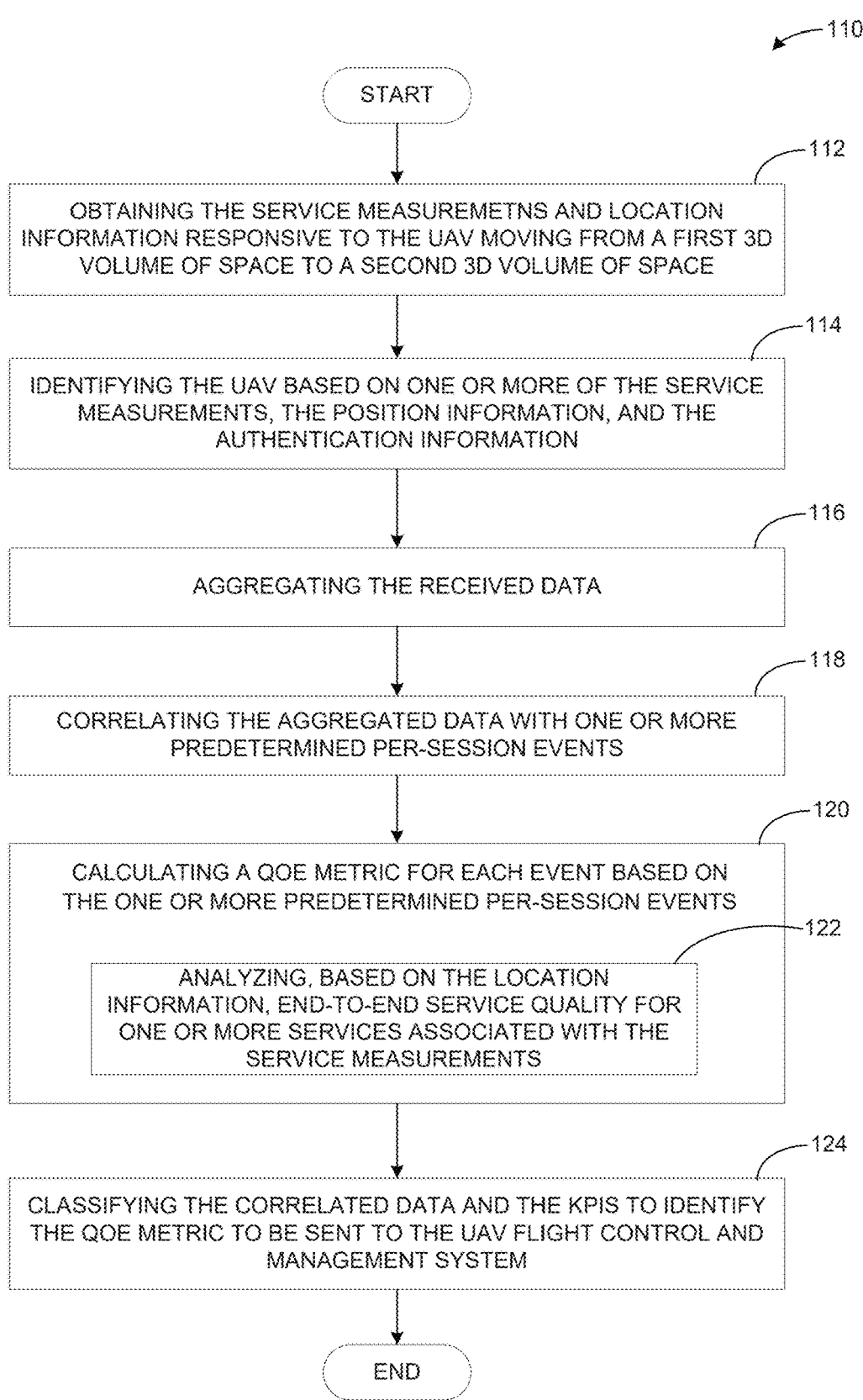
FIG. 4 is a flow diagram illustrating a method for collecting and determining the service quality of a 3-Dimensional (3D) volume of space according to one embodiment of the present disclosure.

FIG. 4 is a flow diagram illustrating a method 110 for collecting the service quality information and determining the service quality of a 3D volume 62 according to one embodiment of the present disclosure. As seen in FIG. 4, data collection and correlation component 32 of NAS 30 obtains the service measurements and the altitude information of a UAV 50 responsive to the UAV 50 moving from a first 3D volume 62 to a second 3D volume 62 (box 112). In one embodiment, for example, the UAV 50 may change its altitude during flight and report that change via RAN 20. The data collection and correlation component 32 then identifies the UAV 50 based on the service measurements, the location information, and the authentication information received via RAN 20 (box 114) and aggregates the received data (box 116). The data may be aggregated on a variety of bases. For example, in one embodiment, the data collection and correlation component 32 aggregates the data on a per-service basis. In another embodiment, the data is aggregated on a per-location basis. In yet other embodiments, the data is aggregated on a per-time resolution basis (e.g., a specified time window) and/or on a per-KPI basis. In some embodiments, the data may be aggregated based on a combination of one or more of these aspects.

Regardless of how the data is aggregated, however, the data collection and correlation component 32 correlates the aggregated data with one or more predetermined per-session events (box 118). Thereafter, responsive to detecting a trigger event to send service quality information to the UAV Flight Control and Management System 40, the 3D Service Quality Interface component 38 calculates a QoE metric for each of the predetermined per-session events (box 120). For example, as previously described, one embodiment of the present disclosure calls for method 110 calculating the QoE metric based on the result(s) of an end-to-end analysis of the service quality for a given 3D region 60 and/or 3D volume 62 for one or more services associated with the collected service measurements (box 122). The 3D Service Quality Interface component 38 then classifies the correlated data and the KPIs to identify the particular QoE metric(s) to be sent to the UAV Flight Control and Management System 40 (box 124).

Figure 5:
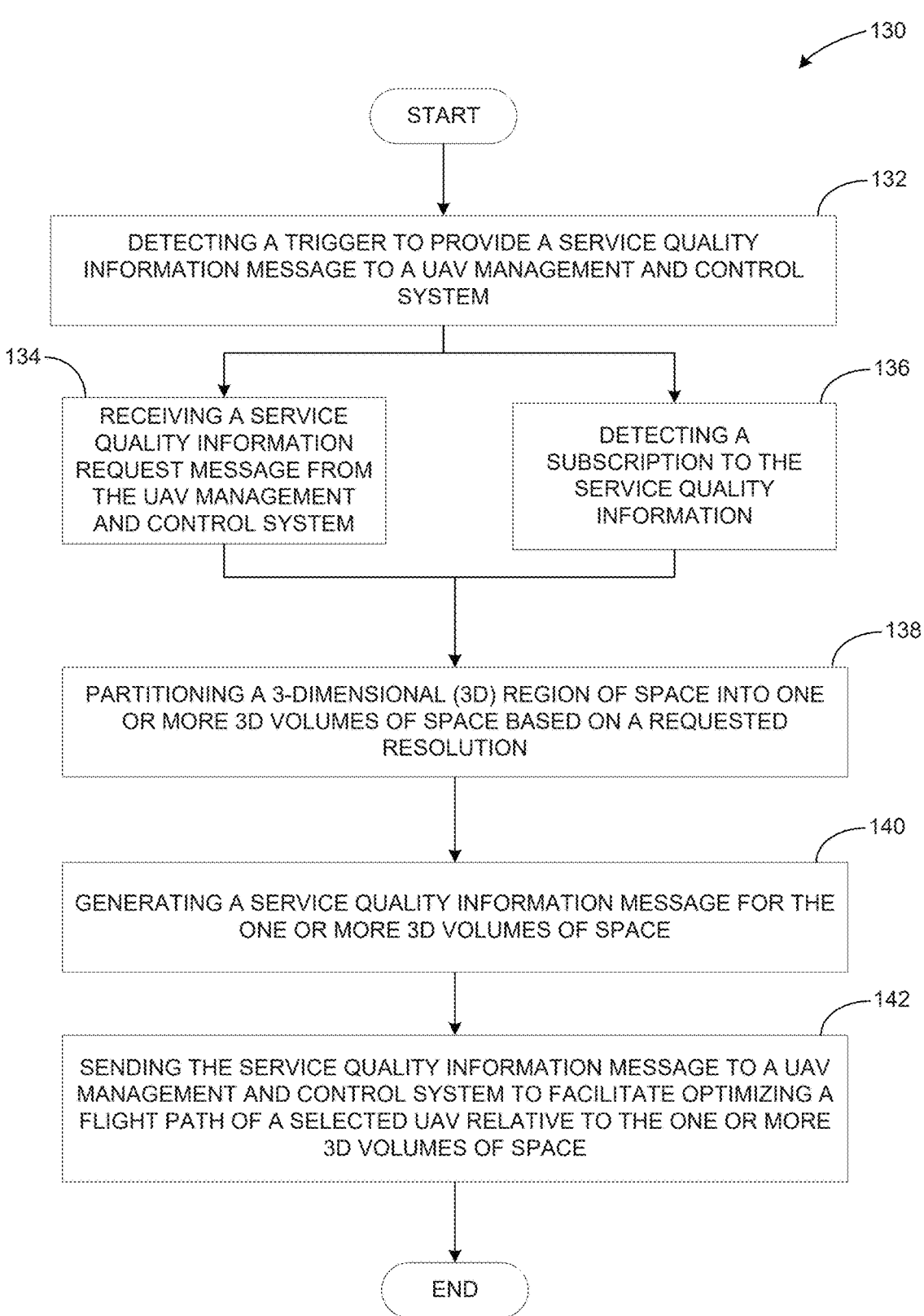
FIG. 5 is a flow diagram illustrating a method of providing service quality information for one or more 3D volumes of space to an operator of a UAV for use in enhancing the service quality for the UAV and for optimizing a flight path of the UAV according to one embodiment of the present disclosure.

FIG. 5 is a flow diagram illustrating a method 130 of providing service quality information for one or more 3D volumes 62 to a network operator of a UAV 50 for use in enhancing the service quality for the UAV 50 and for optimizing a flight path of the UAV 50 according to one embodiment of the present disclosure.

As seen in FIG. 5, method 130 begins with the 3D Service Quality Interface component 38 detecting a trigger to provide a service quality information message to UAV Flight Control and Management system 40 (box 132). In one embodiment, as previously described, the trigger is the receipt of an explicit service quality request message sent from the UAV Flight Control and Management system 40 (box 134). In another embodiment, the trigger is the detection of a subscription by UAV Flight Control and Management system 40 to receive the service quality information message (box 136). Regardless of the particular trigger, however, the 3D Service Quality Interface component 38 partitions the area (i.e., 3D region 60) specified by a requested resolution (i.e., received in the request message or specified in the subscription) into one or more 3D volumes 62—each of which has at least one, and possibly more, QoE metric (box 138). The 3D Service Quality Interface component 38 then generates a service quality information response message that includes the QoE metric(s) (box 140) and sends that message to UAV Flight Control and Management system 40 (box 142). As previously described, the service quality information response message is generated to comprise the information that will facilitate a network operator optimizing the flight path of a given UAV 50 (box 142).

Figure 6:
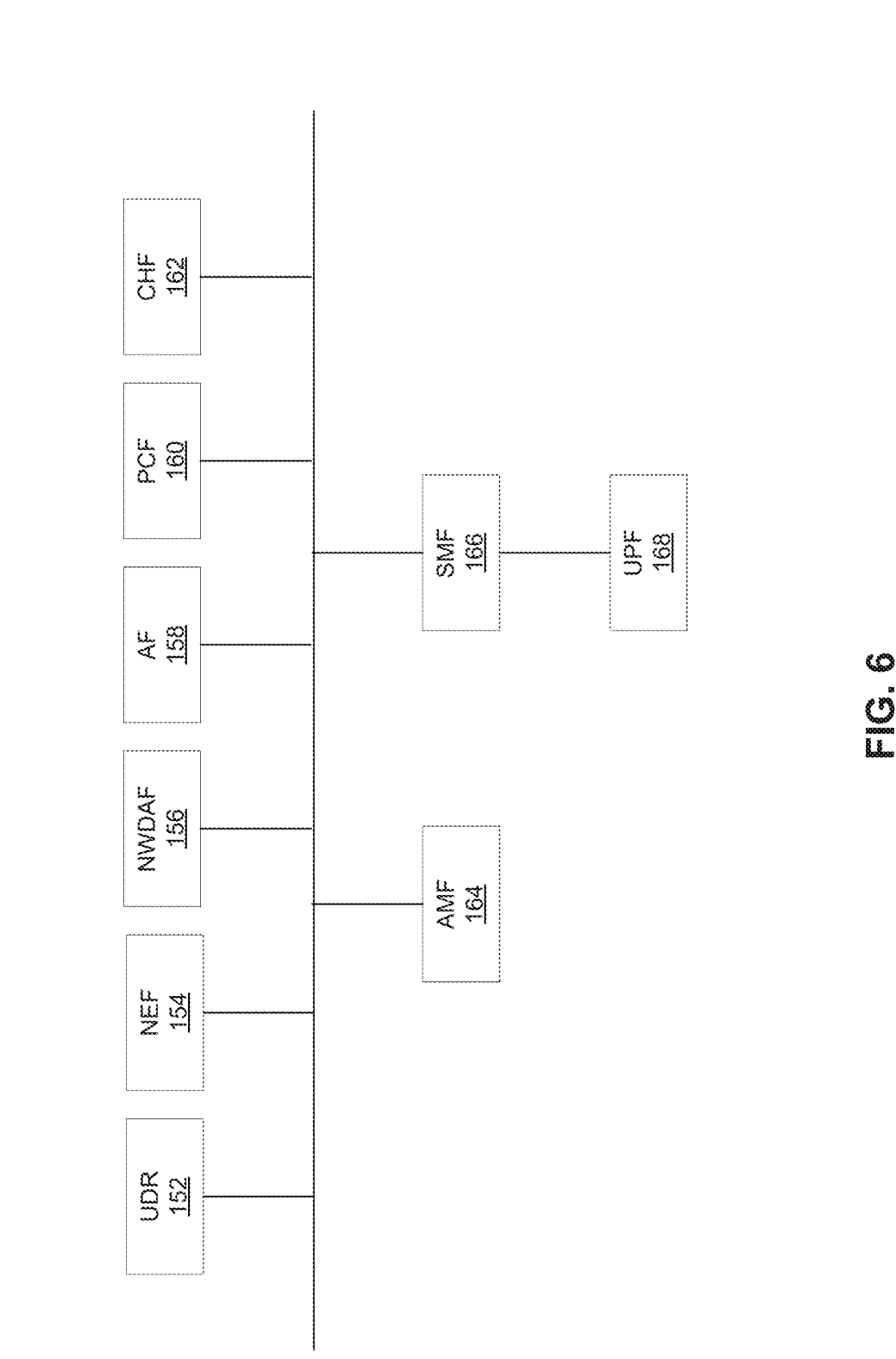
FIG. 6 is a functional block diagram illustrating some network nodes of a core network (CN) configured according to one embodiment of the present disclosure.

Embodiments of the present disclosure are implemented, as stated above, by one or more network nodes. FIG. 6 is a functional block diagram illustrating some network nodes of a core network (CN) 150 configured according to one embodiment of the present disclosure. As seen in FIG. 6, CN 150 comprises a Unified Data Repository (UDR) 152, a Network Exposure Function (NEF) 154, a Network Data Analytics Function (NWDAF) 156, an Application Function (AF) 158, a Policy Control Function (PCF) 160, a Core Charging Function (CHF) 162, an Access & Mobility Management Function (AMF) (164), a Session Management Function (SMF) 166, and a User Plane Function (UPF) 168.

The conventional functions of each of these nodes are well-known in the art, and therefore, not explained in detail here. However, according to the present disclosure, the NWDAF 156 and/or the NEF 154 are specially configured to implement the components of the present disclosure. Particularly, in one embodiment, the NWDAF 156 implements the functionality of the data collection and correlation component 32, the UAV analytics component 34, and the 3D Service Quality Interface component 38. In another embodiment, however, the functions of these components are distributed across other CN nodes. By way of example only, the NWDAF 156 may be configured to implement the functions of the data collection and correlation component 32 and the UAV analytics component 34, while the NEF 154 is configured to implement the functions of the 3D Service Quality Interface component 38.

Figure 7:
FIG. 7 is a functional block diagram illustrating some physical components of a network node configured to implement embodiments of the present disclosure.

FIG. 7 is a functional block diagram illustrating some physical components of a network node 170 configured to implement embodiments of the present disclosure. In one embodiment, the network node 170 is an NWDAF 156 implementing the functions of one or more of the components 32, 34, and 38 of NAS 30. In another embodiment, the network node 170 is an NEF 154 implementing the 3D Service Quality Interface component 38. In either case, network node 170 comprises processing circuitry 172, memory circuitry 176 storing a computer program 176, and communications interface circuitry 178. Those of ordinary skill in the art will readily appreciate that other components are also possible, but not expressly illustrated herein to assist with clarity.

Processing circuitry 172 controls the overall operation of network node 170 and processes the data and information according to the present embodiments. In one embodiment, processing circuitry 172 comprises one or more microprocessors, hardware, firmware, or a combination thereof configured to improve or enhance the service quality of communications for UAVs 50 that are operating in a given 3D region 60 and that are connected to a mobile communications network (e.g., RANs 20). More specifically, processing circuitry 172 is configured, according to at least one embodiment, to obtain service measurements and location information for a UAV 50, wherein the location information comprises an altitude of the UAV 50, determine a QoE metric for the UAV 50 based on the service measurements and the altitude of the UAV 50, and assign the QoE metric to a 3D volume 62 the UAV 50 currently occupies. Additionally, responsive to receiving a request for the service quality information, processing circuitry 172 is configured to send a service quality information message comprising the QoE metric for the 3D volume 62 to a UAV flight control and management system 40. The received information is used to optimize a flight path of a selected UAV relative to the 3D volume 62.

The memory circuitry 174 comprises both volatile and non-volatile memory for storing computer program code and data needed by the processing circuitry 172 for operation. Memory circuitry 174 may comprise any tangible, non-transitory computer-readable storage medium for storing data including electronic, magnetic, optical, electromagnetic, or semiconductor data storage. In one or more embodiments, memory circuitry 174 stores a computer program 166 comprising executable instructions that configure processing circuitry 172 to implement the methods herein described. A computer program 176 in this regard may comprise one or more code modules corresponding to the functions described above.

In general, computer program 176 is stored in a non-volatile memory circuitry 174, such as a ROM, erasable programmable read only memory (EPROM) or flash memory. Temporary data generated during operation may be stored in a volatile memory, such as a random access memory (RAM). In some embodiments, computer program 176 for configuring the processing circuitry 172 as herein described may be stored in a removable memory, such as a portable compact disc, portable digital video disc, or other removable media. The computer program 176 may also be embodied in a carrier such as an electronic signal, optical signal, radio signal, or computer readable storage medium.

The communications circuitry 178 communicatively connects network node 170 to one or more other nodes. In some embodiments, for example, communications circuitry 178 communicatively connects network node 170 to one or more RANs 20 so that it can receive service quality information reported by the UAVs 50. Additionally, communications interface circuitry 178 communicatively connects network node 170 to the UAV Flight Control and Management system 40 via, for example, NEF 154. As such, communications circuitry 168 may comprise, for example, one or more ETHERNET cards and/or other circuitry configured to communicate with RANs 20 and one or more other network nodes.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. 8 is a functional block diagram illustrating the physical hardware and a computer program product that, when executed by the processing circuitry 162 of a network node 160, configures the network node 160 to improve or enhance the service quality of communications for UAVs 50 that are operating in a given 3D region 60 and that are connected to a mobile communications network (e.g., RANs 20). In this embodiment, the advanced techniques disclosed herein may be implemented as hardware units (e.g., circuitry), the computer program 166 comprising one or more software modules, or a combination of both.

In this regard, network node 160 may comprise a data collection and correlation unit/module 180, an analytics unit/module 182, and a mission management and control interface unit/module 184.

The data collection and correlation unit/module 180 comprises instructions that, when executed by processing circuitry 172, causes network node 170 to obtain service measurements and position information for each of a plurality of UAVs 50 operating in a 3D region 60, and that are communicatively connected to a RAN 20. In the present embodiments, the position information comprises the altitude of the UAV 50, as previously described.

The analytics unit/module 182 comprises instructions that, when executed by processing circuitry 172, causes network node 170 to determine a QoE metric for the UAV 50 based on the service measurements and the altitude of the UAV 50, and to assign the QoE metric to a 3D volume 62 the UAV currently occupies, as previously described.

The mission management and control interface unit/module 184 comprises instructions that, when executed by processing circuitry 172, causes network node 160 to send a service quality information message comprising the QoE metric to UAV Flight Control and Management system 40 to facilitate the optimization of a flight path for a selected UAV 50 relative to a 3D volume 62. In this regard, the mission management and control interface unit/module 174 of at least one embodiment comprises instructions that, when executed by processing circuitry 162, causes network node 160 to partition a 3D region 60 into one or more 3D volumes 62 based on a requested resolution, generate a service quality information message for the one or more 3D volumes 62, in which the service quality information message comprises the QoE metric associated with the 3D volume 62 and coordinates identifying the boundaries of the 3D volume 62, and send the service quality information message to UAV Flight Control and Management system 40, as previously described.

Embodiments of the present disclosure further include a carrier containing such a computer program 126. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, such as network node 160, cause the apparatus to perform the methods described herein.

Embodiments further include a computer program product comprising program code portions for performing the steps of any of the embodiments herein when the computer program product is executed by a computing device, such as network node 160. This computer program product may be stored on a non-transitory computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a network node in a core network (CN) comprising memory circuitry storing instructions and processing circuitry configured to execute the instructions, for enhancing a Quality of Experience (QoE) for an Unmanned Aerial Vehicle (UAV), the method comprising:

for each of a plurality of UAVs communicating with one or more cells of a wireless communication network:

obtaining, by the processing circuitry, service measurements and location information for each of the plurality of UAVs via one or more radio access networks (RANs), wherein the location information comprises altitude information for the UAV;

storing, by the processing circuitry, the service measurements and the location information in a database;

partitioning, by the processing circuitry, a 3-Dimensional (3D) region of space into a plurality of 3D volumes of space based on a requested resolution by a UAV management and control system, the resolution indicating a spatial granularity for service quality information to be provided for the plurality of 3D volumes;

for each 3D volume of space:

determining, by the processing circuitry, a QoE metric based on the service measurements and the altitude information stored in the database; and assigning, by the processing circuitry, the QoE metric to the 3D volume of space; and sending, by the processing circuitry, a service quality information message to the UAV management and control system to facilitate optimizing a flight path of a selected UAV relative to the plurality of 3D volumes of space, wherein the service quality information message comprises a list of one or more QoE metrics assigned to the 3D volume of spaces.

2. The method of claim 1 wherein the service measurements and location information are obtained responsive to the UAV crossing a predetermined altitude threshold.

3. The method of claim 1 further comprising obtaining, by the processing circuitry, authentication information for the UAV, wherein the authentication information identifies a device type for the UAV.

4. The method of claim 3 further comprising identifying, by the processing circuitry, the UAV based on one or more of the service measurements, the location information, and the authentication information.

5. The method of claim 1 wherein the service measurements comprise service type information for one or more services being used by the UAV.

6. The method of claim 1 wherein the service measurements comprise key performance indicators (KPIs) for one or more services being used by the UAV.

7. The method of claim 1 wherein the service measurements and location information are obtained for different time resolutions.

8. The method of claim 1 wherein each entry in the database is a service quality record comprising:

coordinates identifying boundaries of the 3D volume of space associated with the entry;

a time interval specifying a length of time during which the entry is valid;

a service type identifying a service associated with the entry;

a KPI type indicating the QoE metric for the service associated with the entry;

an average KPI value for the 3D volume of space relative to the time interval, the service type, and the KPI type;

a number of samples used to determine the average KPI value; and a KPI deviation value indicating a reliability of the KPI average value.

9. The method of claim 8 wherein information in the service quality records is replaced or updated according to a sliding window technique.

10. The method of claim 8 wherein the service measurements and the location information are aggregated in the service quality records and the service measurements and location information are aggregated on:

a per-service basis;

a per-location basis;

a per-time resolution basis; or a per-KPI basis.

11. The method of claim 10 wherein the aggregated service measurements and location information are correlated with one or more per-session predetermined events, and wherein the QoE metric is determined based on the one or more per-session predetermined events.

12. The method of claim 1 further comprising generating, by the processing circuitry, the service quality information message to further include:

coordinates identifying boundaries of each 3D volume of space associated with a QoE metric in the list of one or more QoE metrics;

a service associated with the QoE metric; and the requested resolution indicating a size for each 3D volume of space.

13. The method of claim 1 wherein the service quality information message is sent to the UAV management and control system responsive to determining that the UAV management and control system has subscribed to receive the service quality information message.

14. The method of claim 1 wherein the QoE metric is determined based on weighting the service measurements stored in the database, and wherein the service measurements are weighted based on the age of the service measurements.

15. A method, implemented by a network node in a core network (CN) comprising memory circuitry storing instructions and processing circuitry configured to execute the instructions, for enhancing a Quality of Experience (QoE) for an Unmanned Aerial Vehicle (UAV) communicating with one or more cells of a wireless communication network, the method comprising:

partitioning, by the processing circuitry, a 3-Dimensional (3D) region of space into a plurality of 3D volumes of space based on a requested resolution by a UAV management and control system, the resolution indicating a spatial granularity for service quality information to be provided for the plurality of 3D volumes;

generating, by the processing circuitry, a service quality information message for the one or more 3D volumes of space based on service measurements and altitudes stored in a database, wherein the service quality information message comprises, for each 3D volume of space:

a QoE metric determined for the 3D volume of space; and coordinates identifying boundaries of the 3D volume of space; and sending the service quality information message to the UAV management and control system to facilitate optimizing a flight path of a selected UAV relative to the one or more 3D volumes of space.

16. The method claim of 15 wherein the service quality information message further comprises information indicating the resolution into which the 3D region of space was partitioned, wherein the resolution into which the 3D region of space was partitioned is different than the requested resolution.

17. A network node in a core network (CN) for enhancing a Quality of Experience (QoE) for an Unmanned Aerial Vehicle (UAV) communicating with one or more cells of a wireless communication network, the network node comprising:

memory circuitry storing instructions; and processing circuitry configured to execute the instructions to:

for each of a plurality of UAVs communicating with one or more cells of a wireless communication network:

obtain service measurements and location information for each of the plurality of UAVs via one or more radio access networks (RANs), wherein the location information comprises altitude information for the UAV;

store the service measurements and the location information in a database;

partition a 3-Dimensional (3D) region of space into a plurality of 3D volumes of space based on a requested resolution by a UAV management and control system, the resolution indicating a spatial granularity for service quality information to be provided for the plurality of 3D volumes;

for each 3D volume of space:

determine a QoE metric based on the service measurements and the altitude information stored in the database; and assign the QoE metric to the 3D volume of space; and send a service quality information message to the UAV management and control system to facilitate optimizing a flight path of a selected UAV relative to the plurality of 3D volumes of space, wherein the service quality information message comprises a list of one or more QoE metrics assigned to the 3D volume of spaces.

* * * * *